(12) United States Patent
Ishihara (10) Patent No.: US 6,353,715 B1
(45) Date of Patent: *Mar. 5, 2002

(54) HEAD MOVEMENT FEATURE IN CAMERA EMPLOYING FILM WITH MAGNETIC MEMORY PORTION

(75) Inventor: Masaaki Ishihara, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/325,625

(22) Filed: Oct. 19, 1994

Related U.S. Application Data (63) Continuation of application No. 07/975,001, filed on Nov. 12, 1992, now abandoned.

(30) Foreign Application Priority Data

Nov. 29, 1991 (JP) ............................................. 3-339366

(51) Int. Cl.⁷ ............................................. G03B 17/24
(52) U.S. Cl. ..................................................... 396/320
(58) Field of Search .................................. 354/105, 106; 396/310, 311, 319, 320

(56) References Cited

U.S. PATENT DOCUMENTS

| | | | |
|---|---|---|---|
| 4,864,445 A | * 9/1989 | Tezuka | 360/105 |
| 4,947,196 A | * 8/1990 | Wash et al. | 354/76 |
| 4,952,967 A | 8/1990 | Kazumi et al. | 354/442 |
| 4,972,213 A | 11/1990 | Stoneham et al. | 354/21 |
| 5,005,031 A | * 4/1991 | Kelbe | 354/106 |
| 5,136,318 A | 8/1992 | Aoshima | 354/105 |
| 6,125,240 A | * 9/2000 | Aoshima | 396/320 |

FOREIGN PATENT DOCUMENTS

| | | | |
|---|---|---|---|
| EP | 0433019 | * 6/1991 | |
| JP | 03168624 | 7/1991 | |

* cited by examiner

*Primary Examiner*—Christopher E. Mahoney
(74) *Attorney, Agent, or Firm*—Fitzpatrick, Cella, Harper & Scinto (57) ABSTRACT

A camera employing a film provided with a magnetic memory portion includes a magnetic head for writing data in and/or reading out data from the magnetic memory portion of the film, and a retaining device for retaining the magnetic head having an axis of rotation about which said magnetic head is freely rotatable during a read and/or write operation in such a manner as to follow a film deviation, rotatable about an axis being parallel to a direction in which the film is transported.

24 Claims, 5 Drawing Sheets

HEAD MOVEMENT FEATURE IN CAMERA EMPLOYING FILM WITH MAGNETIC MEMORY PORTION

This application is a continuation of application Ser. No. 07/975,001, filed Nov. 12, 1992, now abandoned.

BACKGROUND OF THE INVENTION

1. Field of the Invention

The present invention relates to an improvement in a camera employing a film provided with a magnetic memory portion and having a magnetic head which comes into contact with the magnetic memory portion of the film to write data to and read out data from the magnetic memory portion.

2. Description of the Related Art

A camera having a retaining mechanism for retaining a magnetic head have been proposed in, for example, Japanese Patent Laid-Open No. Hei 3-168624. Such a camera will be described below with reference to FIGS. 5(a), 5(b) and 5(c).

A magnetic head 101 is fixed to the distal end portion of a retaining member 103. The retaining member 103 is rotates about a support shaft 102 which extends perpendicularly to the direction indicated by a bidirectional arrow A, shown in FIG. 5(a), in which a film is transported.

Figure 5A:
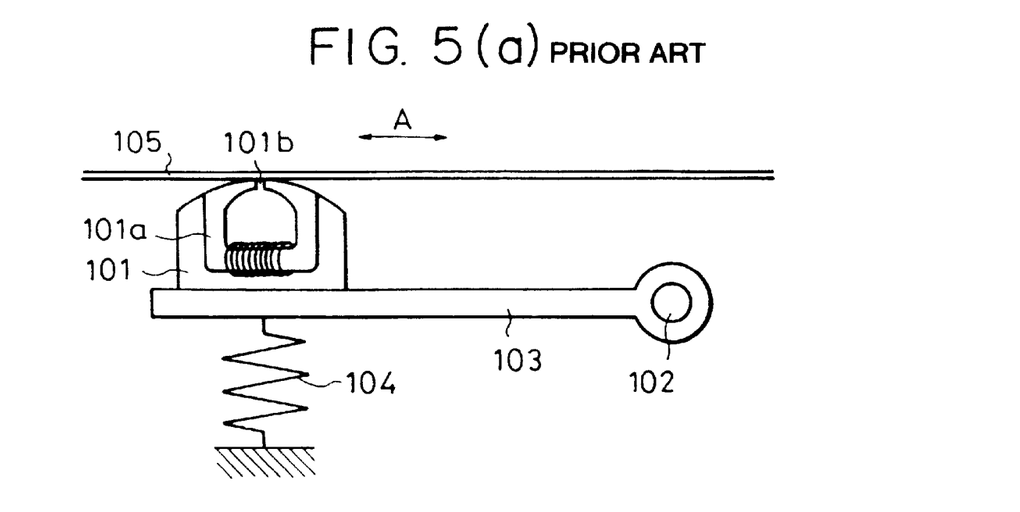
FIGS. 5(a), 5(b), and 5(c) are plan views illustrating a conventional magnetic head and a support shaft for rotatably supporting the magnetic head.
Figure 5B:
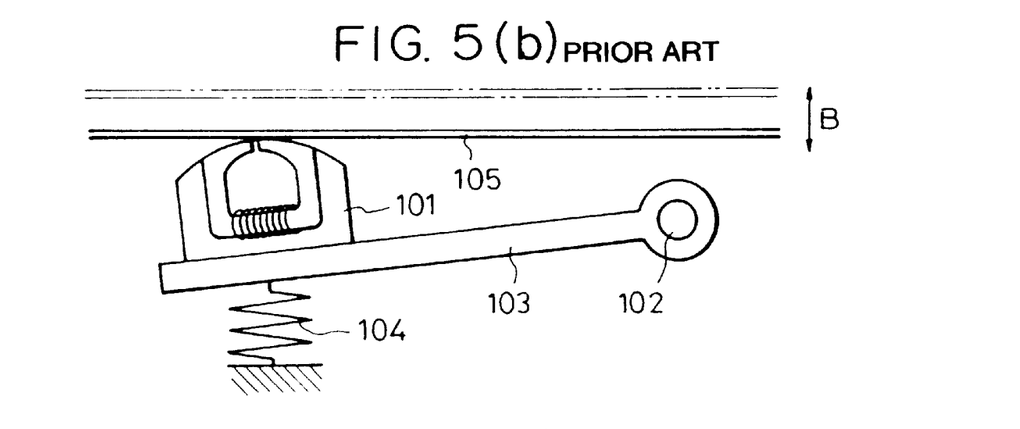

The magnetic head 101 has a core 101a having a gap portion 101b. Core 101a and gap portion 101b are disposed within magnetic head 101. The gap portion 101b is pressed against the magnetic memory portion of the film 105 by means of the elastic force of a pressing spring 104 during transporting of the film, whereby writing of data in and/or reading of data from the magnetic memory portion can be made possible.

U.S. Pat. No. 4,947,196 discloses a structure which movably retains the magnetic head by a flexible member and which restricts the movement of the magnetic head in directions other than a predetermined direction.

However, the aforementioned conventional techniques have the following problems.

That is, in the former technique, the film 105 is retained in a stepped portion (a tunnel portion) established by an inner rail and an outer rail of the camera. Since the step difference of the stepped portion is larger than that of the film 105, the film 105 is allowed to move freely in the stepped portion in the direction of the thickness of the film (which is indicated by a bidirectional arrow B in FIG. 5(b)) during the transporting of the film. On the other hand, when data is written to or read out from the magnetic memory portion of the film 105 by the magnetic head 101, the gap portion 101b of the magnetic head 101 must be brought into close contact with the magnetic memory portion. Since the film 105 fluctuates in the direction indicated by the bidirectional arrow B during the transporting of the film, the magnetic head 101 must follow this fluctuation of the film 105.

Figure 5C:
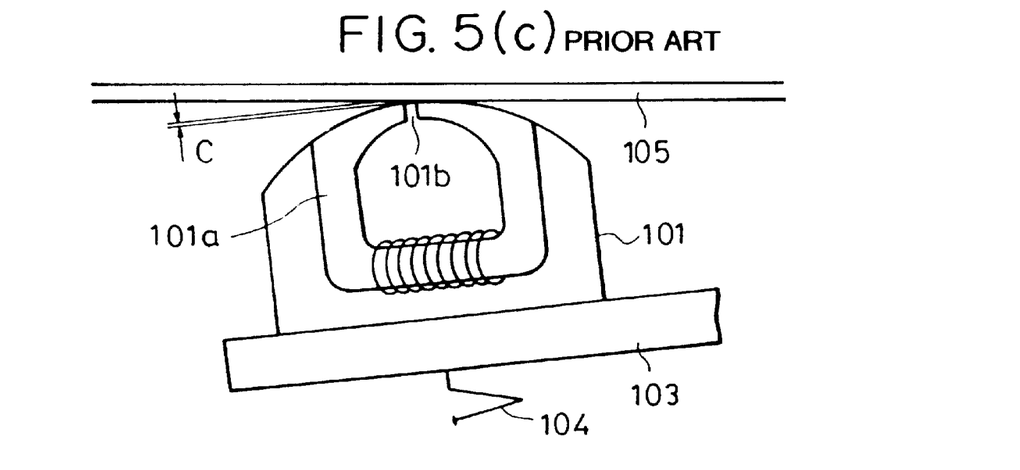

However, the gap portion 101b of the magnetic head 101 is perpendicular to the direction in which the film is transported and has a width of several microns. If the support shaft 102 which allows rocking of the magnetic head 101 through the retaining member 103 is perpendicular to the direction in which the film is transported, as in the case of the aforementioned conventional technique, a gap C, shown in FIG. 5(c), is formed between the gap portion 101b of the magnetic head 101 and the magnetic memory portion of the film 105 by the fluctuation of the film 105. In that case, the gap portion 101b may be prevented from being kept in close contact with the magnetic memory portion, thus preventing writing of data to and/or reading out of data from the magnetic memory portion of the film.

Furthermore, during the assembly, fine adjustment of, for example, the support shaft 102 and the pressing spring 104 is required, thus increasing manufacturing costs.

However, as a practical matter it is difficult for the flexible member to allow the movement of the magnetic head in a particular direction and to restrict the movement thereof in the other directions because deformation of the flexible member is caused by complex composition of flexures in a plurality of directions. Thus, the gap portion 101b of the magnetic head may not be maintained in close contact with the magnetic memory portion of the film due to the fluctuation of the film, as in the case of the former technique. Accordingly, writing of data to and/or reading of data from the magnetic memory portion of the film by the magnetic head may be made impossible.

SUMMARY OF THE INVENTION

An object of the present invention is to provide a camera employing a film with a magnetic memory portion or a device for such a camera, which enables a close contact between a gap portion of a magnetic head and the magnetic memory portion of the film to be maintained so as to reliably write data to and/or read out of data from the magnetic memory portion, even if the film fluctuates.

In one aspect of the present invention, there is provided a camera, or a device for a camera, employing a film provided with a magnetic memory portion, which comprises a magnetic head for writing data to and/or reading out data from the magnetic memory portion of the film, and retaining means for retaining the magnetic head in such a manner as to be rotatable about a shaft which extends in parallel with a direction in which the film is transported.

Other aspects of the present invention will become apparent from the following description of the preferred embodiments of the present invention.

DETAILED DESCRIPTION OF THE PREFERRED EMBODIMENT

An embodiment of the present invention will be described below with reference to FIGS. 1 through 4.

Figure 1:
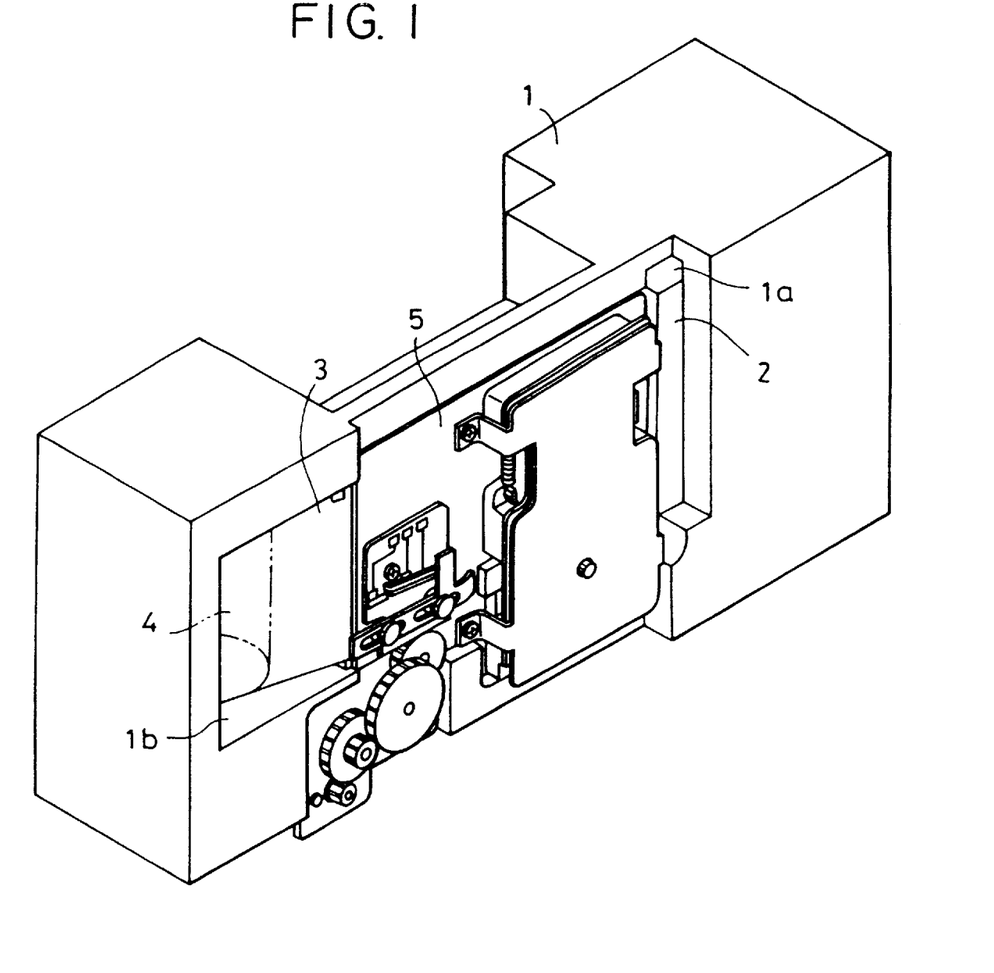
FIG. 1 is a perspective view of the essential parts of a camera in accordance with a preferred embodiment of the present invention.

Referring first to FIG. 1, a camera body 1 has a cartridge chamber 1a and a spool chamber 1b. A film 3 having a magnetic memory portion is accommodated in a film cartridge 2. A spool 4 is rotated by a motor and a transmission gear train, which are not shown, to wind the film 3. A film pressure plate 5 is fixed to the camera body 1.

Figure 2:
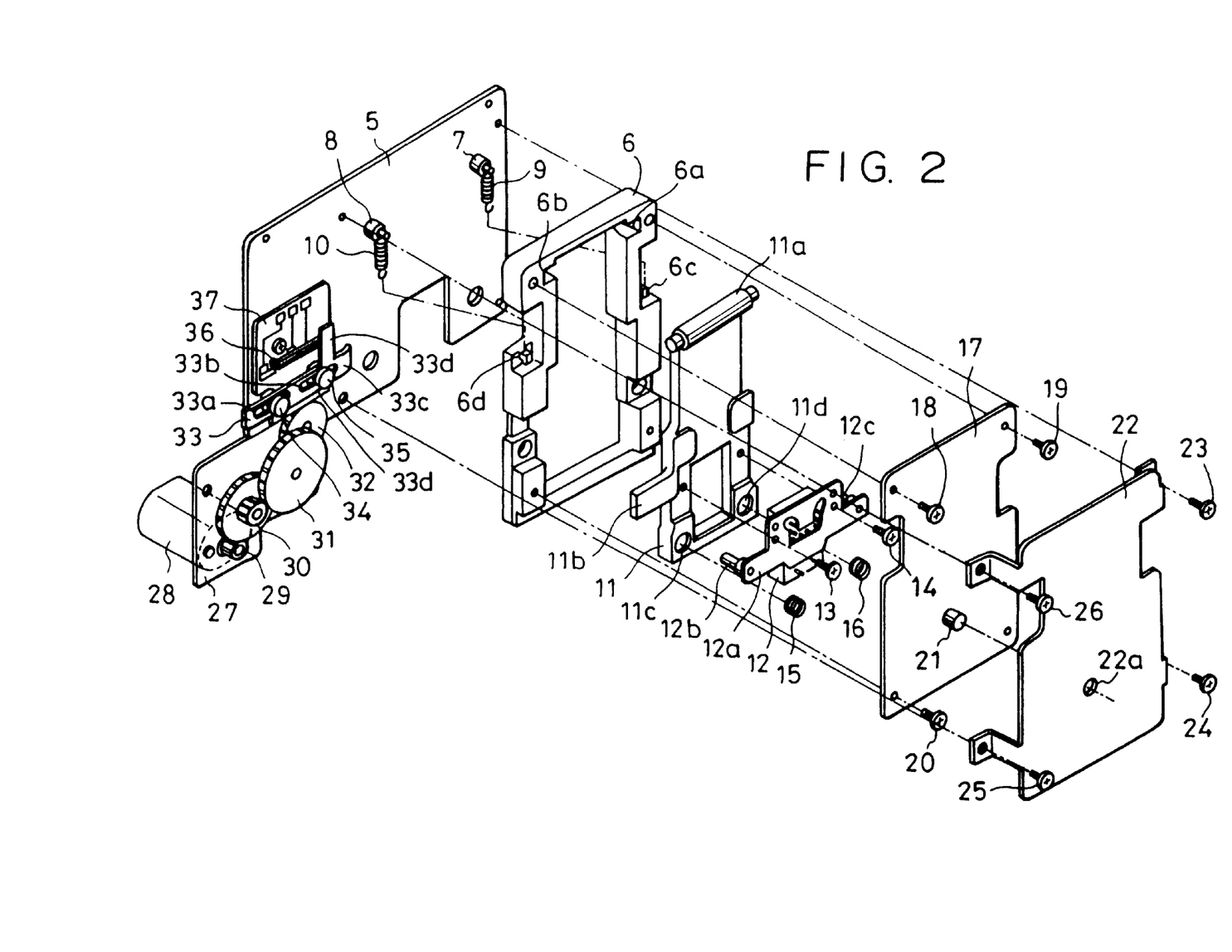
FIG. 2 is an exploded perspective view of a film pressure plate unit in the camera of FIG. 1.

FIG. 2 is an exploded perspective view of the film pressure plate unit of the camera.

A slider holder 6 has bearing portions 6a and 6b and spring holding portions 6c and 6d. The film pressure plate 5 has spring holding anchors 7 and 8 formed therein. Slide springs 9 and 10, respectively, are held by the spring holding portion 6c and the spring holding anchor 7 and by the spring holding portion 6d and the spring holding anchor 8 to urge the slide holder 6 upward. A head holder 11 has a rotary shaft 11a, an arm 11b and spring-receiving portions 11c and 11d. The rotary shaft 11a is parallel to the direction in which the film is transported and is rotatably retained by the bearing portions 6a and 6b of the slide holder 6. A magnetic head 12 for writing data to and/or reading data from the magnetic memory portion of the film 3 integrally includes a mounting baseboard 12a and guide shafts 12b and 12c. The magnetic head 12 is fixed to the head holder 11 by means of screws 13 and 14.

One end of each of pressing spring 15 and pressing spring 16 is in abutment with their corresponding spring-receiving portion 11c and spring-receiving portion 11d of the head holder 11 so as to cause the head holder 11 to rotate about the rotary shaft 11a and thereby cause the magnetic head 12 to press against a surface of the film 3. A spring press 17 is fixed to the slide holder 6 by means of screws 18, 19, 20 and so on. The spring press 17 receives the other ends of the pressing springs 15 and 16. Also, the spring press 17 has a slide guide shaft 21. A slide guide 22 is fixed to the film pressure plate 5 by means of screws 23 through 26. The slide guide 22 has an elongated hole 22a which guides the slide guide shaft 21 in such a manner as to be slidable in the vertical direction and also rotatable.

A motor mounting baseboard 27 is fixed to the camera body 1. A motor 28 is fixed to the motor mounting baseboard 27. A pinion gear 29 fixed to the output shaft of the motor 28 meshes with a two-speed gear 30, which is in turn meshes with a two-speed gear 31. A smaller gear (not shown) of the two-speed gear 31 meshes with an idle gear 32, which in turn meshes with a rack portion 33d of a slide lever 33. The slide lever 33 also has elongated holes 33a and 33b, a tapered portion 33c and an arm 33d. Guide shafts 34 and 35 fixed to the film pressure plate 5 are fitted in the elongated holes 33 and 33b to retain the slide lever 33 in such a manner as to be slidable to the right and left, as viewed in FIG. 2. A phase contact piece 36 is fixed to the arm 33d of the slide lever 33. A phase baseboard 37 is fixed to the film pressure plate 5 to detect in cooperation with the phase contact piece 36 that the slide lever 33 has reached the left and right ends of travel.

Figure 3:
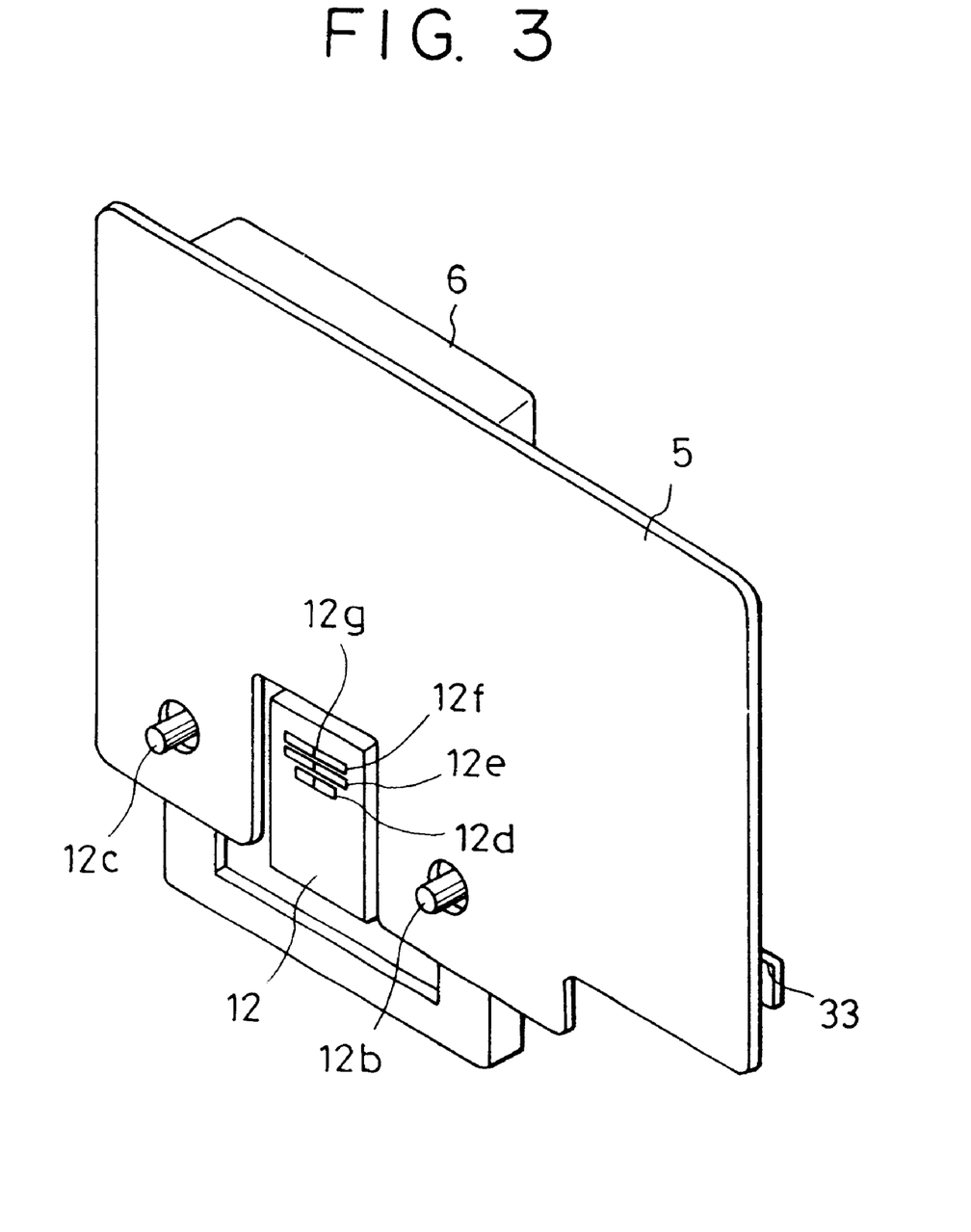
FIG. 3 is a perspective view of the film pressure plate unit of FIG. 2 as viewed from the film side.

In FIG. 3, the magnetic head 12 has a first track forming portion 12d, a second track forming portion 12e and a third track forming portion 12f. Each of the tracks 12d through 12f has a gap portion 12g which is perpendicular to the direction in which the film is transported. Each of the track forming portions 12d through 12f has a width ranging from 0.5 mm to 1 mm. The width of the gap portion 12g is several microns. The guide shafts 12b and 12c are always in contact with the lower end portion of the film 3 by the slide springs 9 and 10 (see FIG. 2).

In the structure arranged in the manner described above, the gap portion 12g of the magnetic head 12 is rotated about the rotary shaft 11a by the pressing springs 15 and 16, so that the gap portion 12g can be always elastically pressed against the surface of the film.

Thus, even if the film 3 fluctuates in the direction of the thickness of the film 3 in the stepped portion (the tunnel portion ) between the inner and outer rails of the camera body 1 during a film transporting operation, the gap portion 12g of the magnetic head 12 can be maintained in contact with the magnetic memory portion.

Figure 4A:
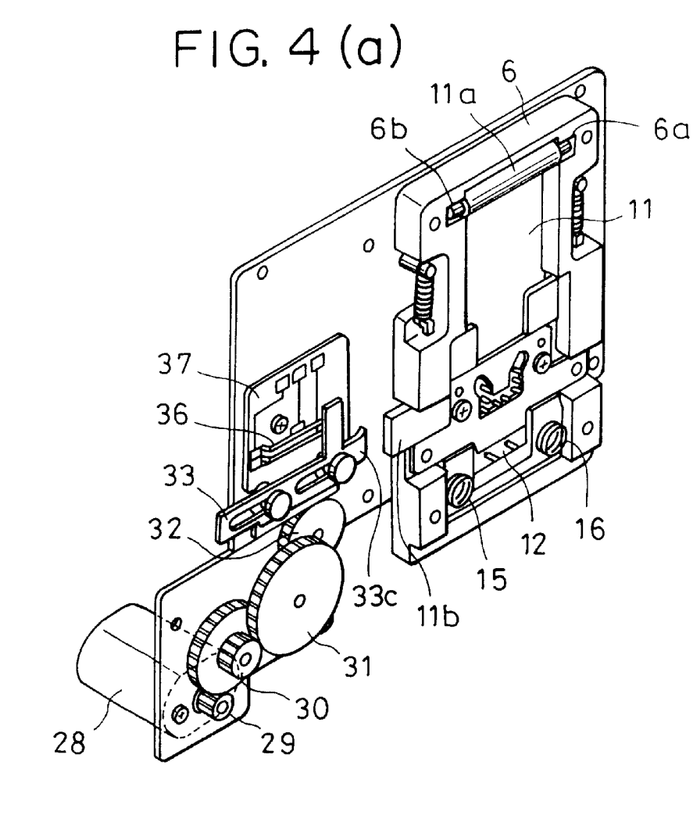
FIGS. 4(a) and 4(b) are perspective views illustrating the state of individual components of the film pressure plate unit of FIG. 2 at the time of the writing data to and/or reading out data and during the exposure operation, respectively.

FIG. 4(*a*) is a perspective view illustrating the state of the components during the film transporting operation, i.e., at the time the magnetic head 12 writes data in and/or reads out data from the magnetic memory portion of the film 3.

When data is written to and/or read out from the magnetic memory portion of the film 3, the motor 28 is driven clockwise to slide the slide lever 33 to the left through the transmission gears 30 through 32. After it is detected by the phase contact piece 36 and the phase base board plate 37 that the slide lever 33 has reached the left end, the drive of the motor 28 is stopped, whereby the gap portion 12g of the magnetic head 12 is pressed against the magnetic memory portion of the film 3 by the elastic force of the pressing springs 15 and 16, as stated above, because the slide lever 33 does not operate on the head holder 11 at all.

Figure 4B:
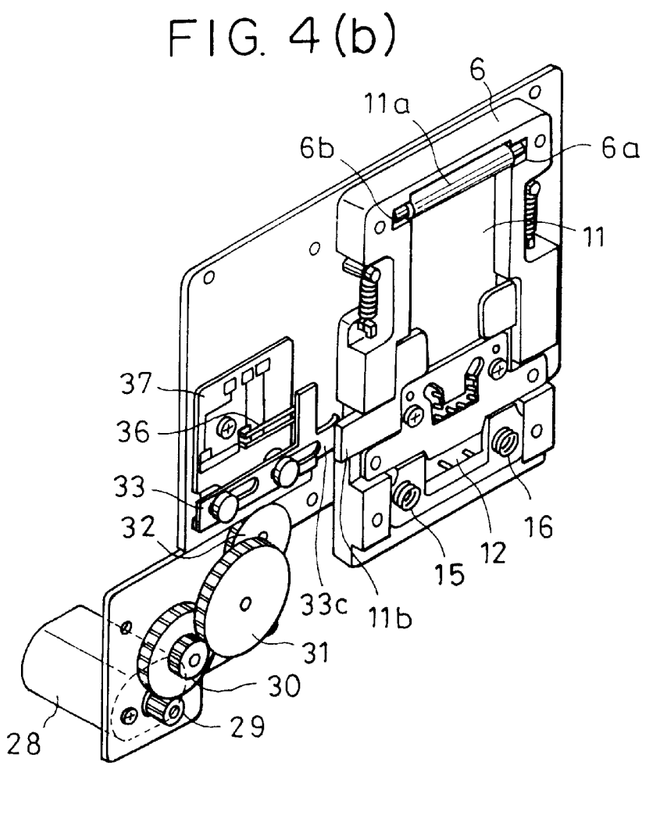

FIG. 4(*b*) is a perspective view illustrating the state during exposure of the film 3.

When the film 3 is exposed, the motor 28 is driven counterclockwise to slide the slide lever 33 to the right through the transmission gears 30 through 32. At that time, the tapered portion 33c of the slide lever 33 is moved below the arm 11b of the head holder 11, pushing the arm 11b up, thereby rotating the head holder 11 about the rotary shaft 11a against the pressing springs 15 and 16, whereby the close contact between the magnetic head 12 and the film 3 is released. In this way, an adverse influence to the flatness of the film 3 during the exposure, caused by the pressing of the magnetic head 12 against the film, can be eliminated.

In order that the rotary shaft 11a of the head holder 11 maintains close contact between the magnetic head 12 and the surface of the film 3 in a constant state as much as possible even when the film 3 fluctuates in the direction of the thickness thereof, it is desirable that the rotary shaft 11a be separated from the magnetic head 12 by the longest possible distance.

Since the member 11 for retaining the magnetic head 12 is arranged to be rotatable about the rotary shaft 11a and the rotary shaft 11a is parallel with the direction in which the film is transported, even if the film 3 fluctuates in the direction of the thickness of the film during film transporting operation, the close contact between the gap portion 12g of the magnetic head 12 and the magnetic memory portion of the film 3 can be reliably maintained. Thus, reliable writing of data to and/or reading out data from the memory portion of the film 3 is possible.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera adapted to employ an image recording medium provided with a memory portion, said camera comprising:

(A) a head for at least one of writing data to and reading out data from the memory portion of the image recording medium; and (B) a head retaining device that retains said head, said head retaining device including a pivot portion and a head supporting portion, said pivot portion having an axis and being pivotably supported at respective ends of said pivot portion to freely rotate the head retaining device about the axis of the pivot portion, thereby to move said head in a direction substantially perpendicular to an image recording medium plane, to shift said magnetic head between a first position, in which said magnetic head is in close contact with the film, and a second position, in which said magnetic head is remote from the image recording medium, wherein said retaining device comprises a structure that positions the image recording medium in the direction substantially perpendicular to the image recording medium plane.

2. A camera according to claim 1, wherein said retaining device comprises an urging device that urges said head to be in close contact with the image recording medium.

3. A camera according to claim 1, wherein said retaining device comprises a switch that switches said head between the first position in which said head is in close contact with the image recording medium and the second position in which said head is separated from the image recording medium.

4. A camera according to claim 1, further comprising a separating device that separates said head from the recording medium and positions said head at a predetermined position.

5. A camera according to claim 4, wherein said separating device comprises a motor.

6. A camera according claim 1, wherein said retaining device comprises a positioning device that positions said axis on an inner side of the camera with respect to said head.

7. A camera according to claim 1, wherein said retaining device follows an image recording medium fluctuation in a direction of the image recording medium plane.

8. A device adapted to employ an image recording medium provided with a memory portion, said device comprising:
  (A) a head for at least one of writing data to and reading out data from the memory portion of the image recording medium; and
  (B) a head retaining device that retains said head, said head retaining device including a pivot portion and a head supporting portion, said pivot portion having an axis and being pivotably supported at respective ends of said pivot portion to freely rotate the head retaining device about the axis of the pivot portion, thereby to move said head in a direction substantially perpendicular to an image recording medium plane, to shift said magnetic head between a first position, in which said magnetic head is in close contact with the film, and a second position, in which said magnetic head is remote from the image recording medium, wherein said retaining device comprises a structure that positions the image recording medium in the direction substantially perpendicular to the image recording medium plane.

9. A device according to claim 8, wherein said retaining device comprises an urging device that urges said head to be in close contact with the image recording medium.

10. A device according to claim 8, wherein said retaining device comprises a switch that switches said head between the first position in which said head is in close contact with the image recording medium and the second position in which said head is separated from the image recording medium.

11. A device according to claim 8, further comprising a separating device that separates said head from the image recording medium and positions said head at a predetermined position.

12. A device according to claim 11, wherein said separating device comprises a motor.

13. A device according to claim 8, wherein said retaining device comprises a positioning device that positions said axis on an inner side of the device with respect to said head.

14. A device according to claim 8, wherein said retaining device follows an image recording medium fluctuation in a direction of the image recording medium plane.

15. A camera adapted to employ a film provided with a magnetic memory portion, said camera comprising:
  (A) a magnetic head for at least one of writing data to and reading out data from the magnetic memory portion of the film; and
  (B) a head retaining device that retains said magnetic head, said retaining device including a pivot portion and a head supporting portion, said pivot portion having an axis and being pivotably supported at respective ends of said pivot portion to freely rotate the head retaining device about the axis of the pivot portion, thereby to move said magnetic head in a direction substantially perpendicular to a film plane, to shift said magnetic head between a first state, in which said magnetic head is in close contact with the film, and a second state, in which said magnetic head is remote from the film, and wherein in the first state said magnetic head is movable in such a manner as to follow a film fluctuation, said axis being substantially parallel with a direction in which the film is transported, said head supporting portion extending from said pivot portion and supporting said magnetic head, said head retaining device having a minimum width in a direction substantially parallel with a direction in which the film is transported that is greater than a width of said magnetic head.

16. A device adapted to employ a film provided with a magnetic memory portion, said device comprising:
  (A) a magnetic head for at least one of writing data to and reading out data from the magnetic memory portion of the film; and
  (B) a head retaining device that retains said magnetic head, said head retaining device including a pivot portion and a head supporting portion, said pivot portion having an axis and being pivotably supported at respective ends of said pivot portion to freely rotate the head retaining device about the axis of the pivot portion, thereby to move said magnetic head in a direction substantially perpendicular to a film plane, to shift said magnetic head between a first state, in which said magnetic head is in close contact with the film, and a second state, in which said magnetic head is remote from the film, and wherein in the first state said magnetic head is movable in such a manner as to follow a film fluctuation, said axis being substantially parallel with a direction in which the film is transported, said head supporting portion extending from said pivot portion and supporting said magnetic head, said head retaining device having a minimum width in a direction substantially parallel with a direction in which the film is transported that is greater than a width of the magnetic head.

17. A camera adapted to employ an image recording medium provided with a memory portion, said camera comprising:
  (A) a head for at least one of writing data to and reading out data from the memory portion of the image recording medium; and (B) a head retaining device that retains said head, said head retaining device including a pivot portion and a head supporting portion, said pivot portion having an axis and being pivotably supported at respective ends of said pivot portion to freely rotate the head retaining device about the axis of the pivot portion, thereby to move said head in a direction substantially perpendicular to an image recording medium plane, to shift said magnetic head between a first state, in which said magnetic head is in close contact with the film, and a second state, in which said magnetic head is remote from the film, and wherein in the first state said magnetic head is movable in such a manner as to follow an image recording medium fluctuation, said axis being substantially parallel with a direction in which the image recording medium is transported, said head supporting portion extending from said pivot portion and supporting said head, said head retaining device having a minimum width in a direction substantially parallel with a direction in which the image recording medium is transported that is greater than a width of the head.

18. A device adapted to employ an image recording medium provided with a memory portion, said device comprising:
  (A) a head for at least one of writing data to and reading out data from the memory portion of the image recording medium; and
  (B) a head retaining device that retains said head, said head retaining device including a pivot portion and a head supporting portion, said pivot portion having an axis and being pivotably supported at respective ends of said pivot portion to freely rotate the head retaining device about the axis of the pivot portion, thereby to move said head in a direction substantially perpendicular to an image recording medium plane, to shift said magnetic head between a first state, in which said magnetic head is in close contact with the film, and a second state, in which said magnetic head is remote from the film, and wherein in the first state said magnetic head is movable in such a manner as to follow an image recording medium fluctuation, said axis being substantially parallel with a direction in which the image recording medium is transported, said head supporting portion extending from said pivot portion and supporting said head, said head retaining device having a minimum width in a direction substantially parallel with a direction in which the image recording medium is transported that is greater than a width of the head.

19. A camera adapted to employ a film provided with a magnetic memory portion, said camera comprising:
  (A) a magnetic head for at least one of writing data to and reading out data from the magnetic memory portion of the film;
  (B) a head retaining device that retains said magnetic head, said head retaining device having a pivot portion and a head supporting portion, said pivot portion being pivotably supported at respective ends of said pivot portion to freely rotate the head retaining device about the axis, thereby to move said magnetic head in a direction substantially perpendicular to a film plane, to shift said magnetic head between a first state, in which said magnetic head is in close contact with the film, and a second state, in which said magnetic head is remote from the film, and wherein in the first state said magnetic head is movable in such a manner as to follow a film fluctuation, said axis being substantially parallel with a direction in which the film is transported, said head supporting portion extending from said pivot portion and supporting said magnetic head, said head retaining device having a minimum width in a direction substantially parallel with a direction in which the film is transported that is greater than a width of the magnetic head; and
  (C) a limiting device that limits the rotation of said head retaining device about the axis during an exposure operation.

20. A camera adapted to employ a film provided with a magnetic memory portion, said camera comprising:
  (A) a magnetic head for at least one of writing data to and reading out data from the magnetic memory portion of the film; and
  (B) a head retaining device that retains said magnetic head, said retaining device including a pivot portion and a head supporting portion, said pivot portion having an axis and being pivotably supported at respective ends of said pivot portion to freely rotate the head retaining device about the axis of the pivot portion, thereby to move said magnetic head in a direction substantially perpendicular to a film plane, to shift said magnetic head between a first state, in which said magnetic head is in close contact with the film, and a second state, in which said magnetic head is remote from the film, said axis being substantially parallel with a direction in which the film is transported, said head supporting portion extending from said pivot portion and supporting said magnetic head, said head retaining device having a minimum width in a direction substantially parallel with a direction in which the film is transported that is greater than a width of said magnetic head.

21. A device adapted to employ a film provided with a magnetic memory portion, said device comprising:
  (A) a magnetic head for at least one of writing data to and reading out data from the magnetic memory portion of the film; and
  (B) a head retaining device that retains said magnetic head, said head retaining device including a pivot portion and a head supporting portion, said pivot portion having an axis and being pivotably supported at respective ends of said pivot portion to freely rotate the head retaining device about the axis of the pivot portion, thereby to move said magnetic head in a direction substantially perpendicular to a film plane, to shift said magnetic head between a first state, in which said magnetic head is in close contact with the film, and a second state, in which said magnetic head is remote from the film, said axis being substantially parallel with a direction in which the film is transported, said head supporting portion extending from said pivot portion and supporting said magnetic head, said head retaining device having a minimum width in a direction substantially parallel with a direction in which the film is transported that is greater than a width of the magnetic head.

22. A camera adapted to employ an image recording medium provided with a memory portion, said camera comprising:
  (A) a head for at least one of writing data to and reading out data from the memory portion of the image recording medium; and
  (B) a head retaining device that retains said head, said head retaining device including a pivot portion and a head supporting portion, said pivot portion having an axis and being pivotably supported at respective ends of said pivot portion to freely rotate the head retaining device about the axis of the pivot portion, thereby to move said head in a direction substantially perpendicular to an image recording medium plane, to shift said magnetic head between a first state, in which said magnetic head is in close contact with the film, and a second state, in which said magnetic head is remote from the film, said axis being substantially parallel with a direction in which the image recording medium is transported, said head supporting portion extending from said pivot portion and supporting said head, said head retaining device having a minimum width in a direction substantially parallel with a direction in which the image recording medium is transported that is greater than a width of the head.

23. A device adapted to employ an image recording medium provided with a memory portion, said device comprising:

(A) a head for at least one of writing data to and reading out data from the memory portion of the image recording medium; and (B) a head retaining device that retains said head, said head retaining device including a pivot portion and a head supporting portion, said pivot portion having an axis and being pivotably supported at respective ends of said pivot portion to freely rotate the head retaining device about the axis of the pivot portion, thereby to move said head in a direction substantially perpendicular to an image recording medium plane, to shift said magnetic head between a first state, in which said magnetic head is in close contact with the film, and a second state, in which said magnetic head is remote from the film, said axis being substantially parallel with a direction in which the image recording medium is transported, said head supporting portion extending from said pivot portion and supporting said head, said head retaining device having a minimum width in a direction substantially parallel with a direction in which the image recording medium is transported that is greater than a width of the head.

24. A camera adapted to employ a film provided with a magnetic memory portion, said camera comprising:

(A) a magnetic head for at least one of writing data to and reading out data from the magnetic memory portion of the film;

(B) a head retaining device that retains said magnetic head, said head retaining device having a pivot portion and a head supporting portion, said pivot portion being pivotably supported at respective ends of said pivot portion to freely rotate the head retaining device about the axis, thereby to move said magnetic head in a direction substantially perpendicular to a film plane, to shift said magnetic head between a first state, in which said magnetic head is in close contact with the film, and a second state, in which said magnetic head is remote from the film, said axis being substantially parallel with a direction in which the film is transported, said head supporting portion extending from said pivot portion and supporting said magnetic head, said head retaining device having a minimum width in a direction substantially parallel with a direction in which the film is transported that is greater than a width of the magnetic head; and (C) a limiting device that limits the rotation of said head retaining device about the axis during an exposure operation.

* * * * *

UNITED STATES PATENT AND TRADEMARK OFFICE
CERTIFICATE OF CORRECTION

PATENT NO. : 6,353,715 B1  Page 1 of 1
DATED : March 5, 2002
INVENTOR(S) : Masaaki Ishihara It is certified that error appears in the above-identified patent and that said Letters Patent is hereby corrected as shown below:

<u>Title page,</u>
Item [56], References Cited, FOREIGN PATENT DOCUMENTS:
"03168624" should read -- 3-168624 --.

<u>Column 1,</u>
Line 19, "have" should read -- has --.
Line 23, "is" should be deleted.

<u>Column 2,</u>
Line 28, "of" should be deleted.
Line 65, "la" should read -- 1a --.

<u>Column 3,</u>
Line 37, "is" should be deleted.

<u>Column 4,</u>
Line 30, "to" should read -- on --.

Signed and Sealed this

Third Day of September, 2002

Attest:

Attesting Officer

JAMES E. ROGAN
*Director of the United States Patent and Trademark Office*